United States Patent

Lutz et al.

[11] Patent Number: 5,404,453
[45] Date of Patent: Apr. 4, 1995

[54] TERMINALS COUPLING SYSTEM USING BRIDGE INTERFACES, LOCATED INSIDE THE HOST CONTROLLER, WITH TIMER TO DETERMINE START AND END OF TRANSMISSION PERIOD

[75] Inventors: Dusty L. Lutz, Miamisburg; Richard E. Berry, Beavercreek, both of Ohio

[73] Assignee: NCR Corporation, Dayton, Ohio

[21] Appl. No.: 581,857

[22] Filed: Sep. 13, 1990

[51] Int. Cl.⁶ ............... G06F 13/00; G06F 13/10; G06F 13/12
[52] U.S. Cl. ............... 395/275; 364/DIG. 2; 364/940; 364/940.3; 395/200
[58] Field of Search ............... 395/275, 325, 200; 364/940.3, 940; 370/85.13; 178/71 R

[56] References Cited

U.S. PATENT DOCUMENTS

| | | | |
|---|---|---|---|
| 4,025,905 | 5/1977 | Gorgens | 395/275 |
| 4,063,220 | 12/1977 | Metcalfe et al. | 340/147 |
| 4,099,024 | 7/1978 | Boggs et al. | 178/71 R |
| 4,106,104 | 8/1978 | Nitta et al. | 395/325 |
| 4,264,954 | 4/1981 | Briggs et al. | 395/275 |
| 4,282,512 | 8/1981 | Boggs et al. | 340/147 |
| 4,358,825 | 11/1982 | Kyu et al. | 395/325 |
| 4,562,535 | 12/1985 | Vincent et al. | 395/325 |
| 4,627,052 | 12/1986 | Hoare et al. | 370/88 |
| 4,667,193 | 5/1987 | Cotie et al. | 340/825.08 |
| 4,700,342 | 10/1987 | Egami | 370/85 |
| 4,737,953 | 4/1988 | Koch et al. | 370/94 |
| 4,760,533 | 7/1988 | Buckley et al. | 393/575 |
| 4,852,041 | 7/1989 | Nakano | 395/500 |
| 4,930,121 | 5/1990 | Shiobara | 370/85.4 |
| 5,123,091 | 6/1992 | Newman | 395/200 |
| 5,151,897 | 9/1992 | Suzuki | 370/85.13 |
| 5,202,593 | 4/1993 | Huang et al. | 307/470 |

FOREIGN PATENT DOCUMENTS 0287878 10/1988 European Pat. Off.

OTHER PUBLICATIONS

Informatik Spektrum, vol. 13 No. 4, Aug. 1990, Berlin, DE, pp. 217–220.

*Primary Examiner*—Thomas C. Lee
*Assistant Examiner*—D. Dinh
*Attorney, Agent, or Firm*—Elmer Wargo

[57] ABSTRACT

A system including a host terminal having a controller which is coupled to a plurality of bridge interfaces, with each bridge interface being coupled to a separate plurality of secondary terminals over an associated data link. Each bridge interface has a communications chip, like an RS-422 chip therein. The controller is able to communicate with any secondary terminal in the separate pluralities of secondary terminals via the associated bridge interface without having to rely on a transmit/receive control line from the controller to each of said communication chips. In another embodiment, the bridge interface is used as a repeater.

4 Claims, 5 Drawing Sheets

TERMINALS COUPLING SYSTEM USING BRIDGE INTERFACES, LOCATED INSIDE THE HOST CONTROLLER, WITH TIMER TO DETERMINE START AND END OF TRANSMISSION PERIOD

BACKGROUND OF THE INVENTION (1) Field of the Invention

This invention relates to an interface for coupling a host terminal to a plurality of secondary terminals via standard communication chips.

(2) Background Information

FIG. 1 shows a prior art system which includes a host terminal or primary which is coupled to a plurality of secondary (Second.) terminals via a communication chip like the RS-422 XCVR. The host terminal or primary may be an NCR-5267 Financial Workstation, for example, and the secondary terminals may include a printer, magnetic card reader, keyboard, and the like. The primary polls the peripherals or secondary terminals over an RS-422 line using a conventional protocol such as Intel I8051. The NCR-5267 mentioned has a video display; however, it is not operated through the communication chip.

As an enhancement to the NCR-5267 Financial Workstation, there is provided an option which permits two bank tellers to operate their separate workstations while using the same host or primary. A teller's workstation may include several secondary terminals (shown in FIG. 1), with these secondary terminals including a printer, magnetic card reader, and a keyboard, for example.

One of the problems with the system described in the previous paragraph is that when two tellers' workstations operate from one NCR-5267 Financial Workstation, six connection nodes were required for making the connections to the tellers' workstations; three connection nodes were located in the base of the NCR-5267 and three were located in a plug-in board associated with the Workstation. One possible solution was to place a repeater in the system. However, this solution was not satisfactory because when the repeater was housed in the primary to reduce the cost of the system, the dirty signals or those containing noise from the secondary terminals were introduced into the interior of the primary. This was not a good solution because from a design standpoint, it is better to keep everything on the outside of the primary decoupled from what is on the inside of the primary to minimize noise generation and electromagnetic interference (EMI). The cables to the secondary terminals function as antennae and pick up the noise mentioned.

SUMMARY OF THE INVENTION

The present invention obviates the problems mentioned in the Background in that the dividing up of signals to go to the first and second workstations mentioned is effected through bridge interfaces which are located in the interior of the primary or host terminal. Any amplification of these signals is done on "clean" signals rather than "dirty" signals as previously discussed.

The bridge interface of this invention acts as a bridge between the primary and a communication chip to which the associated secondary terminals are coupled. Each communication chip can drive a predetermined number of secondary terminals, and with the bridge interface, additional branches or sets of secondary terminals can be added to the system.

In a first aspect of this invention, there is provided a system comprising:
- a host terminal having a controller therein;
- at least a first bridge interface and a second bridge interface;
- coupling means for coupling said first and second bridge interfaces to said controller;
- a first plurality of secondary terminals and a first data link for coupling said secondary terminals to said first bridge interface; and
- a second plurality of secondary terminals and a second data link for coupling said second plurality of secondary terminals to said second bridge interface;
- said first and second bridge interfaces each having a communication chip therein to enable said controller to send a message to any one of the secondary terminals within said first and second pluralities of secondary terminals.

In another aspect of this invention, there is provided a system comprising:
- a host terminal having a controller therein;
- a first communication chip coupled to to said controller;
- a first plurality of secondary terminals;
- a first data link coupling said first plurality of secondary terminals to said communication chip;
- a second communication chip coupled to said first communication chip;
- a bridge interface coupled to said second communication chip;
- a second plurality of secondary terminals; and
- a second data link coupling said second plurality of secondary terminals to said bridge interface;
- said bridge interface having a third communication chip therein to enable said bridge interface to function as a repeater; and
- said first, second, and third communication chips being identical.

The above advantages and others will become more easily understood in connection with the following specification, claims, and drawing.

DESCRIPTION OF THE PREFERRED EMBODIMENT

Figure 2:
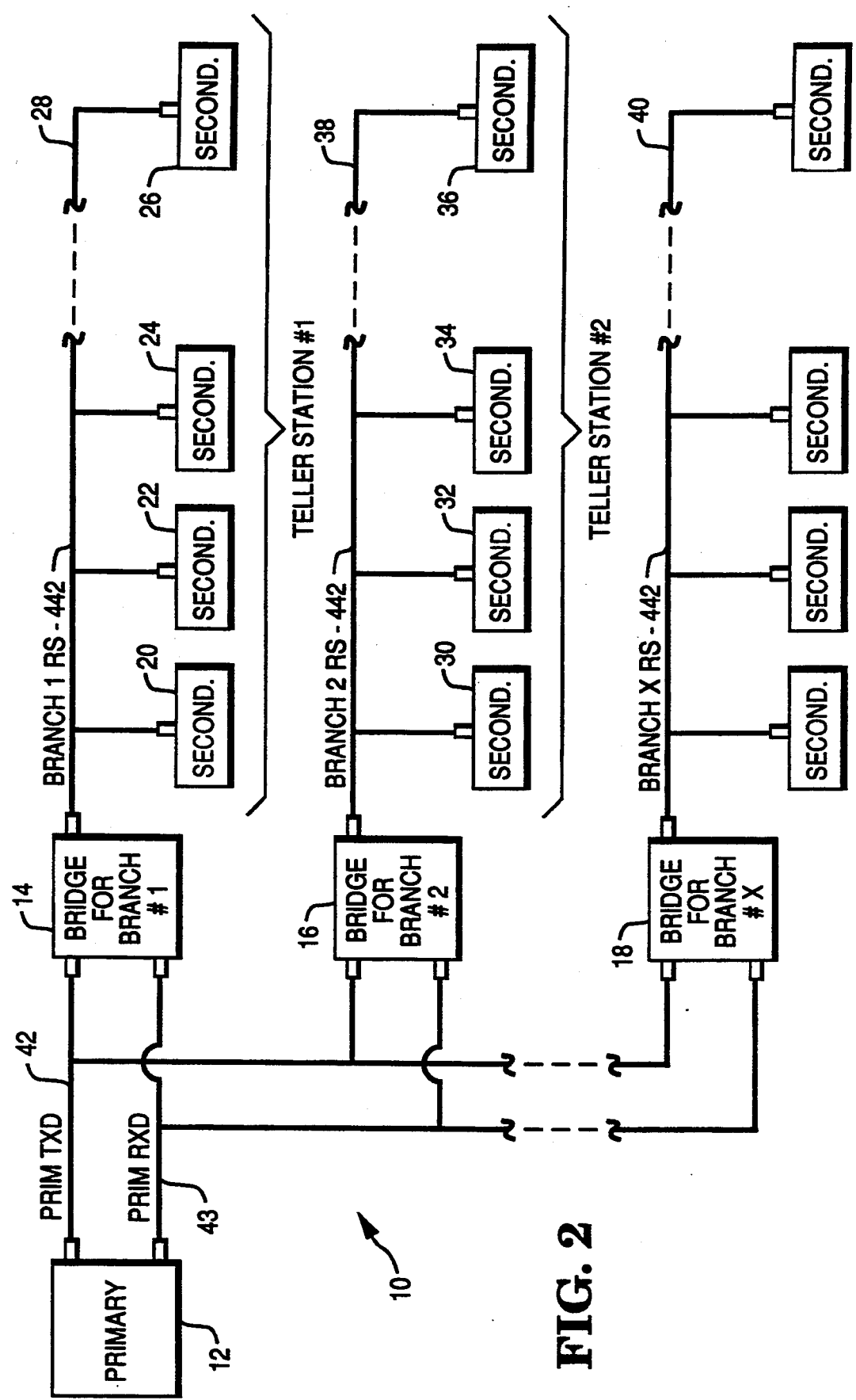
FIG. 2 is a schematic diagram showing a preferred embodiment of this invention showing a primary or host terminal, a plurality of bridge interfaces coupled to the primary, and a plurality of secondary terminals coupled to each one of the bridge interfaces.

FIG. 2 is a schematic diagram showing a preferred embodiment of a system 10 made according to this invention, showing a host terminal or primary 12 and a plurality of bridge interfaces, hereinafter referred to as bridges 14, 16, and 18. Each bridge, like 14, has a plurality of secondary (Second.) terminals coupled to it over a data link. For example, secondary terminals 20, 22, 24, and 26 are coupled to the bridge 14 over a data link 28. Secondary terminal 20 may be a keyboard, terminal 22 may be a magnetic stripe reader, terminal 24 may be a printer, and terminal 26 may be a numeric key pad. Naturally, different terminals may be selected for different applications. The secondary terminals 20, 22, 24, and 26 taken together may comprise a Teller Station #1 as alluded to earlier herein.

Correspondingly, secondary terminals 30, 32, 34, and 36 may comprise a Teller Station #2, with these terminals being coupled to the bridge 16 over a data link 38. The Teller Stations #1 and #2 are coupled to the same primary 12 via the bridges 14 and 16. In the embodiment described, each of the bridges 14, 16, and 18 includes a conventional RS-422 XCVR transceiver chip and the data links 28, 38, and 40 may be an RS-422 data link using the Intel I8051 protocol. Bridge 14 may be considered as Branch #1, bridge 16 may be considered as Branch #2 and bridge 18 may be considered as Bridge #X to show how the system 10 is expandable. Bridge 18 has a plurality of secondary terminals coupled to it over the data link 40.

Because the bridges 14, 16, and 18 are all identical, a discussion of only bridge 14 will be given. The design philosophy of bridge 14 (FIG. 2) is that only one device, like the primary 12 or one of the secondary terminals like 20 or 30, will transmit data at any given time. The architecture of the system 10 is such that the primary 12 polls each one of the secondary terminals, like 20 and 22, in sequence. Whenever the primary 12 sends a message, it is received by each of the bridges 14, 16, and 18 and is transmitted to each of the corresponding data links, like 28, 38, and 40. This insures that the particular secondary terminal, like 20 or 30, gets the message. Each bridge, like 14, listens for a message being sent from one of the secondary terminals, like 22 or 24, for example, and when appropriate, the bridge 14 transmits the message to the primary 12.

In the embodiment described, the primary 12 is an NCR-5267 Financial Workstation which is currently available from the NCR Corporation of Dayton, Ohio. One of the options with the NCR-5267 is that it can be supplied with a plug-in board which enables it to serve two teller workstations. When the NCR-5267 is operated by two teller stations, a software and hardware addition entitled "Teller DOS" is utilized; this is utilized, essentially, to enable a video terminal to be operated from a Workstation #2 in addition to having a video terminal being operated at a Workstation #1. Teller DOS is also currently available from NCR Corporation. The bridge 14, for example, may be located on the "mother" board within the NCR-5267, and the bridge 16 may be located on the same plug-in board on which the TELLER DOS is located. Because the bridges 14 and 16 are located within the primary 12, they do not pick up the noise which may be picked up by the data links 28, 38, and 40 which may, at times, function as antennae as previously discussed.

Some additional advantages of the system 10 shown in FIG. 2 need to be mentioned. As far as the primary 12 is concerned, it looks as though the primary 12 is communicating or "talking" to only one communication chip (located within the bridges, like 14), even though it is talking to a plurality of them. This meant that no modifications were necessary to the primary 12. With the bridges 14, 16, and 18 being located on the inside of the primary 12, only "clean" signals were handled within the primary 12. Each one of the bridges, like 14, for example, can drive only a predetermined number of secondary terminals. However, with the system 10 shown in FIG. 2, additional bridges can be added to drive additional sets of secondary terminals, as shown in relation to those secondary terminals coupled to bridge 18. The primary 12 is coupled to each of the bridges 14, 16, and 18 over the links 42 and 43. In the prior art system shown in FIG. 1, an additional transmit/receive control from the primary tc the communications chip is necessary.

Figure 3A:
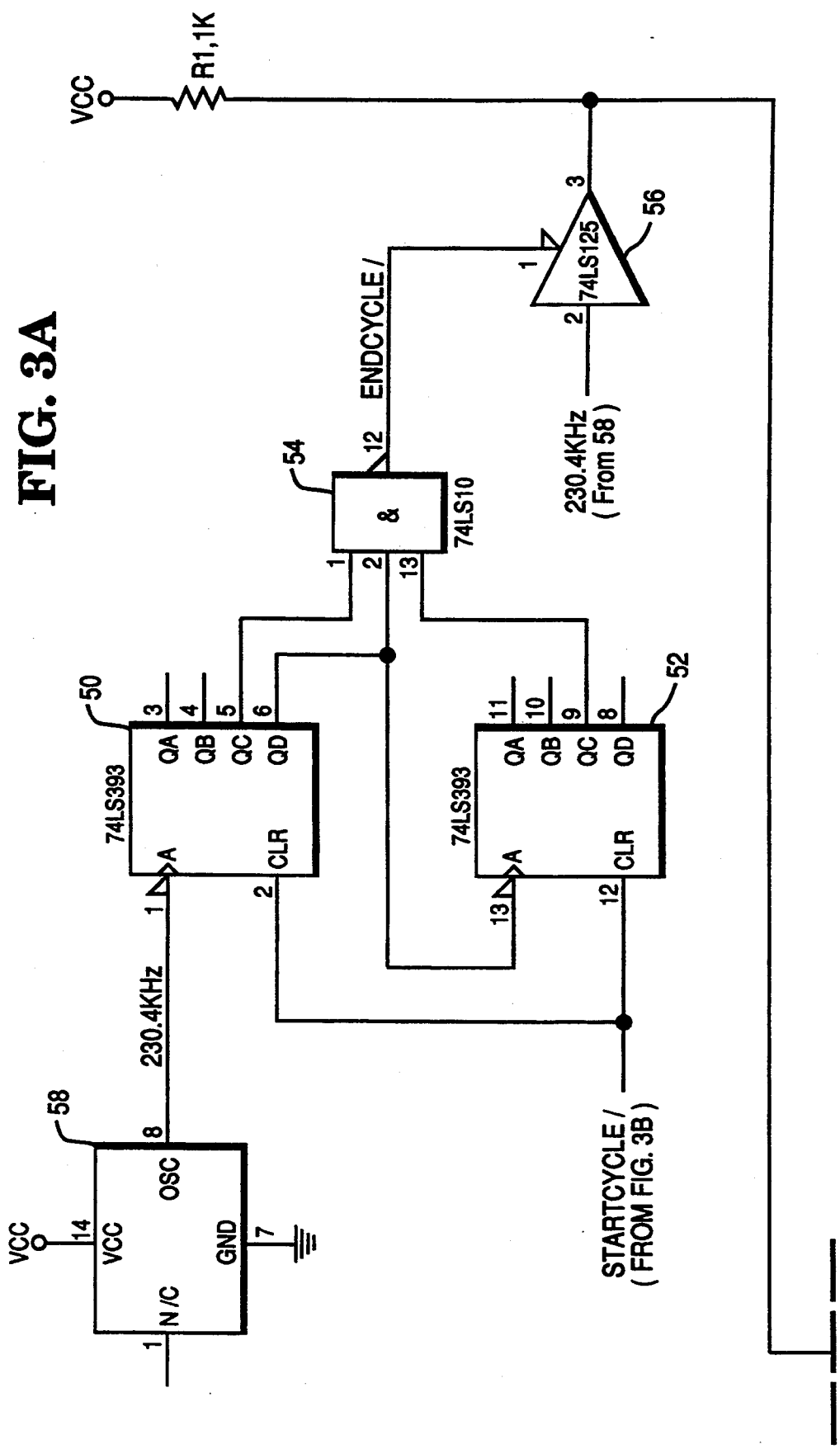
FIGS. 3A and 3B taken together show additional details of the bridge interfaces shown in FIG. 2.
Figure 3B:
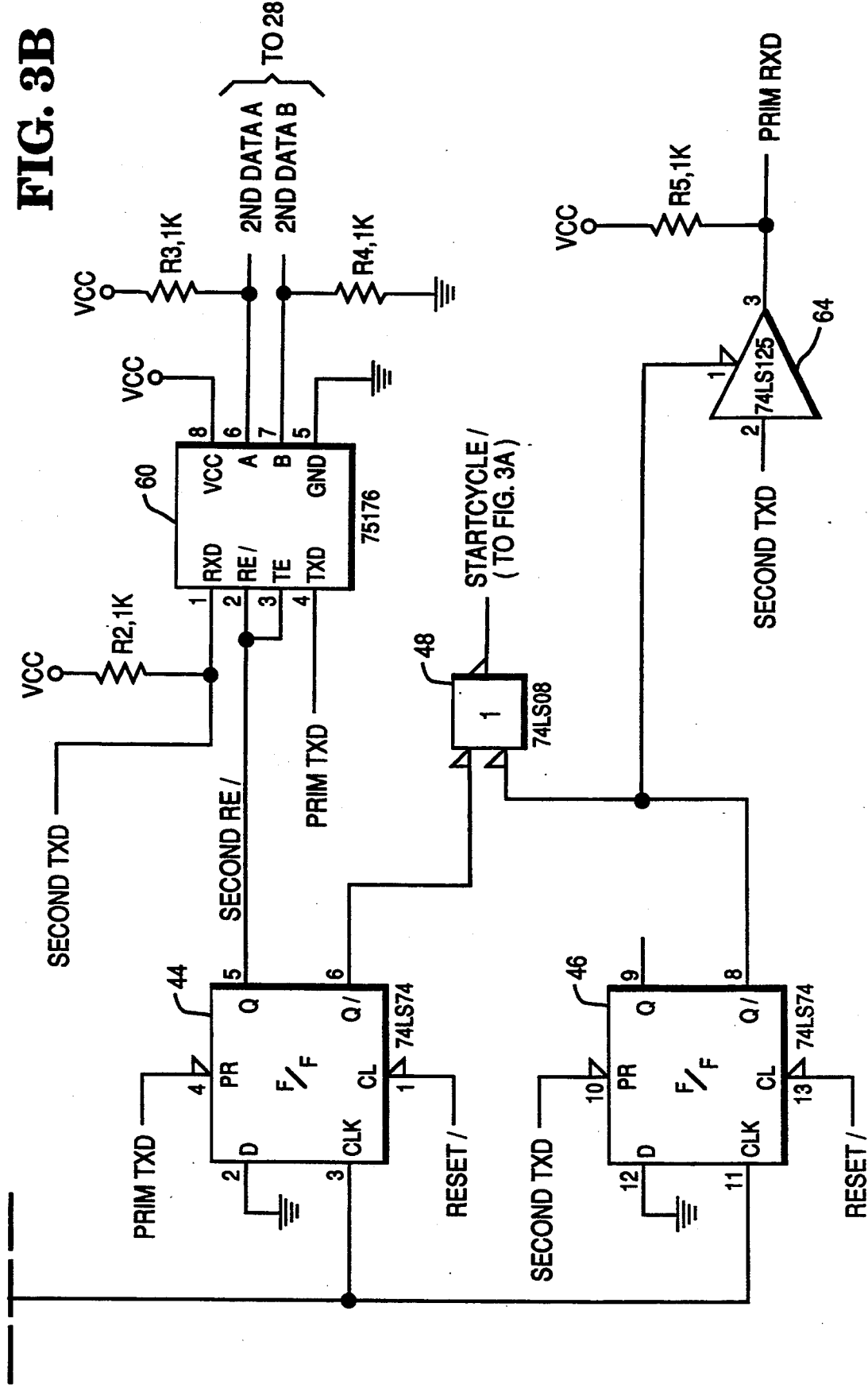

The bridge 14, shown in FIG. 2, is shown in more detail in FIGS. 3A and 3B; the various elements included in the bridge 14 are identified on these figures. As stated earlier herein, the design of the system 10 is such that only the primary 12 or one of the secondary terminals, like 20, "talks" at any one time. In effect, the bridge 14 listens for either of these sides, primary 12 or one of its secondary terminals to transmit, and when one of the sides transmits, the bridge 14 transmits the message to the other side.

In the bridge 14, a means for listening is provided by flip flops 44 and 46 shown in FIG. 3B. Flip flop 44 listens for transmit signal (PRIM TXD) from the primary 12, and flip flop 46 listens for a transmit signal (SECOND TXD) from one of the secondary terminals, like 20 or 22 shown in FIG. 2. With the Intel I8051 protocol mentioned, the lines for PRIM TXD and SECOND TXD idle at a high level, and when one of these signals becomes active, the associated line falls to a low level. For example, when the primary 12 wants to transmit, the PRIM TXD signal causes a low level on pin 4 of flip flop (F/F) 44. The F/F 44 is of the preset variety, which for this illustration, means that the Q output thereof rises to a high level, and the Q/(read as Q Bar) thereof falls to a low level. The low level at the input of AND gate 48 generates a low level signal (STARTCYCLE/) at the output thereof, and this signal is used to enable the counters 50 and 52 (FIG. 3A) to start counting to determine when the message from the primary should end.

In the embodiment described, the counters 50 and 52 (FIG. 3A) are incremented at a rate of 230.4 KHz when conditioned by the STARTCYCLE/signal mentioned. A NAND gate 54 functions as a decoder for the outputs of the counters 50 and 52, to generate an ENDCYCLE/signal when a predetermined count (72 in the embodiment being described) is reached; this generates an end of message signal for the transmission from the primary 12 to one of the secondary terminals, like 20, in the example being described. The ENDCYCLE/signal from the NAND gate 54 is fed into the tri-state gate 56 which conditions it to permit a clocking pulse from an oscillator 58 to pass therethrough to pin #3 of the F/F 44 to clear F/F 44, thereby ending the transmission of the message. In effect, the counters 50 and 52, the oscillator 58, and the NAND gate 54 function as a means for determining a transmission period for sending messages across a communication chip 60. Pin #1 to tri-state gate 56 is the control signal for this gate; whenever pin #1 is at a low level, whatever is on pin #2 thereof is transmitted to pin #3 thereof. Whenever pin #1 is at a high level, the gate 54 goes tri-state which means that whatever is on pin #2 does not matter because pin #3 will be kept at a highlevel by a pull-up resistor R1. In other words, the pull-up resistor R1 insures that the gate 56 is in an inactive state when the signal on Pin #1 is at a high level.

The PRIM TXD signal to the F/F 44 which generated the STARTCYCLE/also conditions the communication chip 60 (hereinafter referred to as C/chip 60) via the Q output (SECOND RE/) of the F/F 44. In the embodiment described, the C/chip 60 used is an RS422 transceiver, although other communication chips with similar control lines may be used. When so conditioned, a message from the primary 12 may be sent to one of the secondary terminals, like 20 or 22, for example, via the PRIM TXD input to the C/chip 60.

Figure 4:
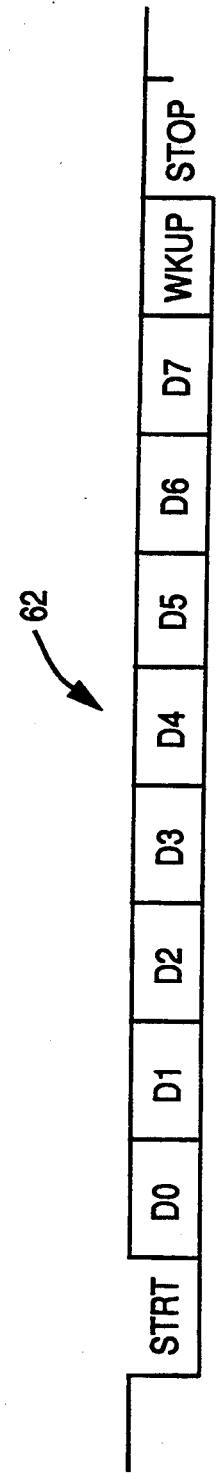
FIG. 4 (shown on the sheet with FIG. 1) is a schematic diagram showing a message format used by the system shown in FIG. 2.

The format for a message 62 is shown in FIG. 4; this is the format using the Intel I8051 protocol mentioned earlier herein. The message 62 starts at a low level (from a high level) by a start bit (STRT) which is followed by 8 data bits, going from D0 through D7. The eighth data bit D7 is followed by a wakeup bit (WKUP) and a STOP bit. The data bits are binary ones or zeros according to the particular data being transmitted.

As an aside, there are additional protocols which "sit" on top of the Intel protocol mentioned. For example, there is a conventional Standard Peripheral Interface Protocol (currently available from NCR Corporation) which is above the Intel protocol mentioned. For example, this additional protocol, coming from the primary 12, may indicate the address of the secondary terminal, like 20 or 22, to which the message is to be directed. The selected secondary terminal then prepares itself to accept the message to follow. Because this aspect is conventional, it need not be described in further detail. These various other protocols are transparent to the bridge 14. Essentially, when the bridge 14 sees a START bit, it starts to transmit, and when it counts to the middle of a STOP bit in the message 62, it stops transmitting.

In the embodiment described, the particular baud rate used is 31,250 bits/second. This translates into a bit time of 32 microseconds and a message time of 352 microseconds; this message time is measured from the beginning of the START bit to the end of the STOP bit. The particular bridge, like 14, used can be used for different baud rates by varying the frequency of the oscillator 54. The optimum frequency is calculated by the following equation:

$$F = 72/T,$$

wherein,

F = the oscillator frequency, and
T = the time from the START bit to the middle of the STOP bit.

When a START bit from the primary 12 is detected, the message is transmitted to all the branches, like 1 and 2 in FIG. 2, until the middle of the STOP bit which occurs about 330 microseconds later. Pull-up resistors, like R3, and pull-down resistors, like R4 (FIG. 3B) insure that the STOP bit is continued after the associated C/chip 60 within the bridges 14, 16, and 18 is disabled.

When one of the secondary terminals, like 20, wishes to transmit data to the primary 12 after having been polled for transmission to the primary 12, the following sequence of events takes. The F/F 46 idles with the C/chip 60 listening for data from the secondary side or the secondary terminals, like 20. During this idling of the F/F 46, there is no data being transmitted to the primary 12 through a tristate gate 64 due to pin 1 thereof being kept a high level by the Q/output of the F/F 46. When a start bit from a secondary terminal is detected by the C/chip 60, the signal SECOND TXD (pin 1) changes from a high level to a low level. The low level SECOND TXD signal is fed into pin 10 of the F/F 46, causing it to be preset. When preset, the Q/output of the F/F 46 changes from a high level to a low level, enabling the tri-state gate 64 to pass the data from the secondary terminal, like 20, to the primary 12. The data is passed through pin 1 of the C/chip 60 through the tristate gate 64 to the primary 12 when this gate is conditioned.

The Q/output from the F/F 46 also conditions the AND gate 48 to generate the STARTCYCLE/signal previously discussed in relation to F/F 44; this signal enables, the counters 50 and 52 to start counting. When the predetermined count of 72 (in the embodiment described) is reached, the NAND gate 54 (which functions as a decoder) generates the ENDCYCLE/signal. This time period being discussed relative to the count of 72 corresponds to 312.5 microseconds, and it starts after the beginning of the START bit and ends at approximately the middle of the Stop bit in the message 62 shown in FIG. 4. The ENDCYCLE/bit conditions the tri-state gate 56 as previously described, causing the F/F 46 to return to its idle or listening mode. When in the idle mode, no data is transmitted to the primary 12 via the tri-state gate 64. Pull up resistor R5 insures that the STOP bit is continued to the primary 12 after the tri-state gate 64 is disabled.

The messages being transmitted are passed over data links 28 and 38 to the associated secondary terminals, like 20 and 30. The data links 28 and 38 are conventional two conductor links (Data A and Data B as shown in FIG. 3B), with these conductor links being differential communication links. In essence, this type of communication presents two versions of the same signal, with one signal always being the opposite of the other.

Figure 5:
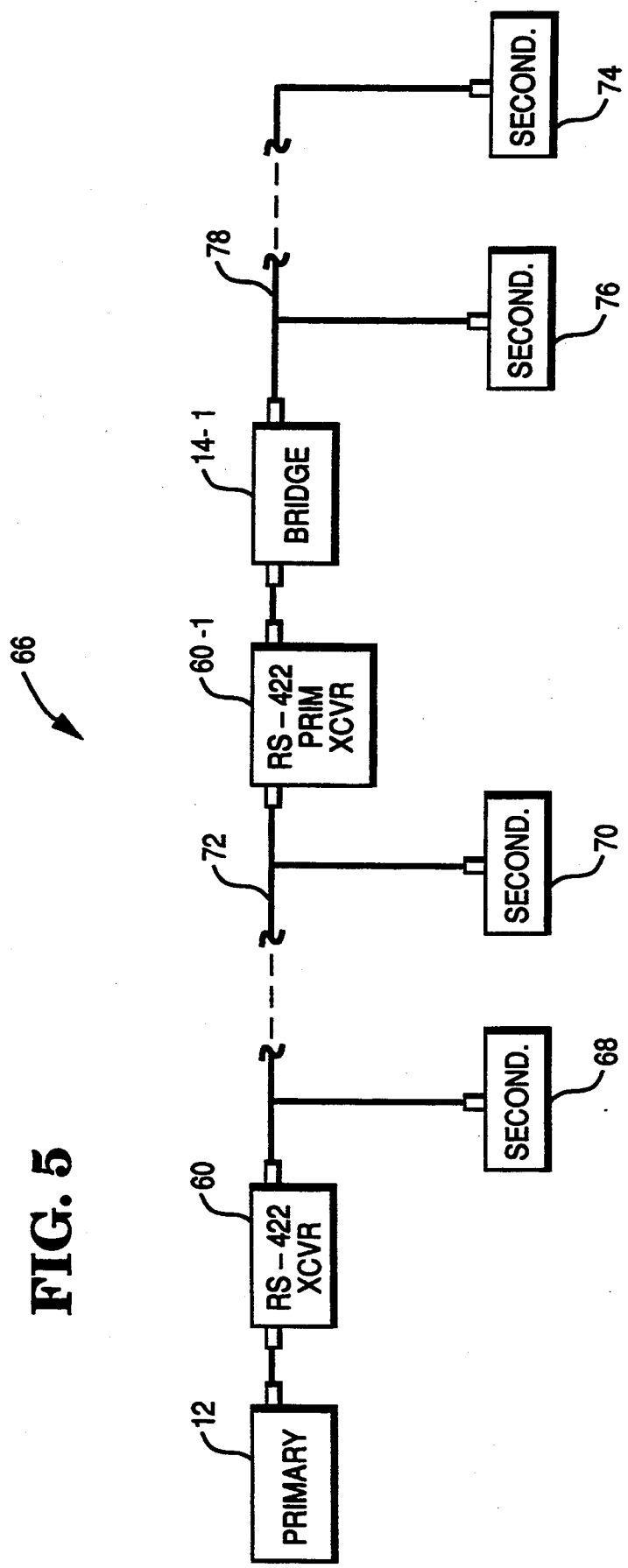
FIG. 5 is a schematic diagram showing a system which utilizes a bridge interface of this invention as a repeater.

FIG. 5 shows a system 66 in which the bridge 14 is used as a repeater. In this system 66, a primary 12 is coupled to secondary terminals 68 and 70 via a C/chip 60 over a data link 72. The system 66 may be used whenever the data link 72 becomes quite long with a large number of secondary terminals thereon. Data link 72 is similar to the data links 28 and 38 already discussed in relation to FIG. 2. The bridge 14-1 has a C/chip 60 therein, similar to the C/chip 60 already discussed in relation to FIGS. 3A and 3B, and secondary terminals 74 and 76 are coupled to the bridge 14-1 over a data link 78 similar to data link 28. Bridge 14-1 in FIG. 5 is identical to bridge 14 discussed in relation to FIGS. 3A and 3B. Accordingly, only a few signals need to be discussed to identify the pertinent connections between the C/chip 60-1 which couples the bridge 14-1 to the data link 72. C/chip 60-1 is identical to C/chip 60.

The pertinent connections when coupling the C/chip 60-1 to the bridge 14-1 (FIG. 5) are as follows. The "Receive Data" terminal (Pin 1) of C/chip 60-1 is connected to Pin 4 (PRIM TXD) of the F/F 44 associated with the bridge 14-1. The "Transmit Data" signal (Pin 4) of C/chip 60-1 is connected to Pin 3 (PRIM RXD) of the tri-state gate 64 of the bridge 14-1. And finally, the "Receive Enable/" (Pins 2 and 3 of the C/chip 60-1 are connected to the Q output (Pin 9) of the F/F 46 associated with the bridge 14-1. These connections control the C/chip 60-1 so that the bridge 14-1 idles, listening for a transmission on data link 72, and repeating it to data link 78 when one is present. When a transmission is made on data link 78, these connections mentioned allow the bridge 14-1 to repeat the transmission on to data link 72.

Figure 1:
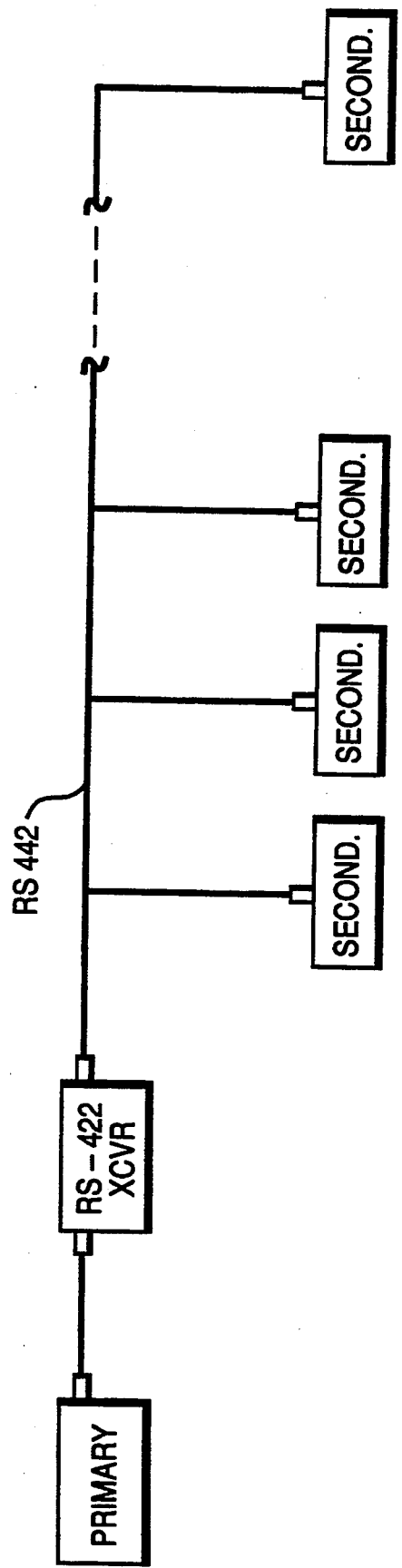
FIG. 1 is a schematic diagram of a prior art system which shows a host or primary terminal connected to a plurality of secondary terminals via a standard communication chip.

In the prior art system shown in FIG. 1, the primary shown therein is also coupled to the RS-422 C/chip via a transmit/receive control line (not shown) which controls the flow of data being transmitted through the C/chip mentioned. In the systems 10 shown in FIG. 2 and the system 66 shown in FIG. 5 the transmission period mentioned with regard to the oscillator 58, counters 50 and 52, and the NAND gate 54 is what determines the period during which a message is sent across the C/chip 60. The message is sent across the C/chip without using the transmit/receive control line from the primary 12 to each of the C/chips 60. If the transmit/receive control line were connected to each of the C/chips in the system 10, for example, the primary would not be able to tell which secondary, like 20 or 30, for example, was transmitting data to the primary 12.

What is claimed is:

1. A system comprising:
   a host controller having a motherboard with a controller thereon, with said controller having a transmit/receive control line thereon;
   at least a first bridge interface and a second bridge interface located on said motherboard within said host controller, with said first and second bridge interfaces being coupled in parallel to said controller;
   a first plurality of secondary terminals and a first data link for coupling said secondary terminals to said first bridge interface; and
   a second plurality of secondary terminals and a second data link for coupling said second plurality of secondary terminals to said second bridge interface;
   said first and second bridge interfaces each having a communication chip therein to enable said controller to send a message to any one of secondary terminals within said first and second pluralities of secondary terminals;
   first and second pluralities of secondary terminals and said first and second data links being located outside said host controller;
   each of said first and second bridge interfaces having a determining means for determining a transmission period during which a message is sent from said controller to one of said secondary terminals in said first and second pluralities of secondary terminals instead of relying on said transmit/receive control line from said controller to each of said communication chips to determine the start and end of said transmission period;
   said determining means including:
   a tri-state gate for enabling said message to pass therethrough in response to a first signal coming from said transmit/control line to initiate the start of said transmission period and to disable said message from passing through said tri-state gate in response to a second signal to terminate the end of said transmission period; and
   logic circuitry for generating said second signal after a predetermined time period starting in response to said first signal.

2. A system comprising:
   a host controller having a motherboard with a controller thereon;
   at least a first bridge interface and a second bridge interface located on said motherboard within said host controller, with said first and second bridge interfaces being coupled in parallel to said controller;
   a first plurality of secondary terminals and a first data link for coupling said secondary terminals to said first bridge interface; and
   a second plurality of secondary terminals and a second data link for coupling said second plurality of secondary terminals to said second bridge interface;
   said first and second bridge interfaces each having a communication chip therein to enable said controller to send a message to any one of secondary terminals within said first and second pluralities of secondary terminals;
   said first and second pluralities of secondary terminals and said first and second data links being located outside said host controller; and
   said first and second bridge interfaces being identical;
   said first bridge interface additionally comprising;
   listening means for generating a start cycle signal in response to a request to transmit from said controller;
   period means for defining a transmission period during which a valid message is transmitted from said controller to each of the communication chips in said system, with said start cycle signal initiating the start of said transmission period and an end cycle signal ending the transmission period;
   said period means also including:
   a tri-state gate for enabling said message to pass therethrough in response to said start cycle signal and to disable said message from passing through said tri-state gate in response to said end cycle signal; and
   logic circuitry for generating said end cycle signal after a predetermined time period starting in response to said start cycle signal.

3. The system as claimed in claim 2 in which said listening means includes a first flip flop which is used to generate said start cycle signal in response to said request to transmit from said controller, and also includes a second flip flop which is also used to generate said start cycle signal in response to a request to transmit from one of said secondary terminals of said first and second pluralities of secondary terminals.

4. The system as claimed in claim 3 in which said period means includes:
   counters;
   an oscillator for incrementing said counters at a predetermined frequency; and
   a decoder coupled to said counters for generating said end cycle signal when a predetermined count is reached on said counters.

* * * * *